No. 820,734. PATENTED MAY 15, 1906.
A. W. RALPH.
TREE PROTECTING ATTACHMENT FOR AGRICULTURAL IMPLEMENTS.
APPLICATION FILED DEC. 26, 1905.
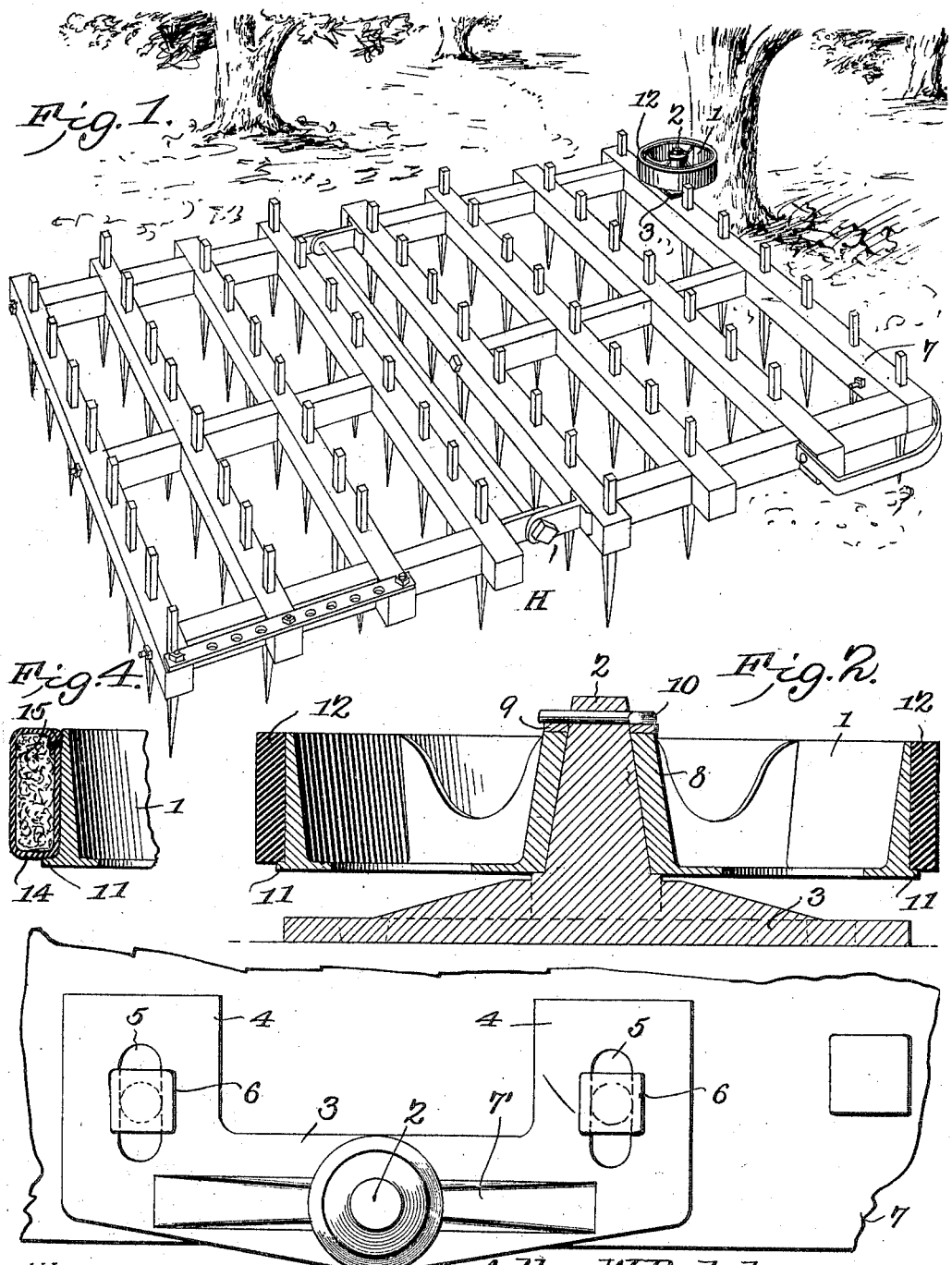
WITNESSES:
Arthur W. Ralph, INVENTOR.
By
ATTORNEYS

UNITED STATES PATENT OFFICE.

ARTHUR WILLIAM RALPH, OF UKIAH, CALIFORNIA.

TREE-PROTECTING ATTACHMENT FOR AGRICULTURAL IMPLEMENTS.

No. 820,734.     Specification of Letters Patent.     Patented May 15, 1906.

Application filed December 26, 1905. Serial No. 293,343.

*To all whom it may concern:*

Be it known that I, ARTHUR WILLIAM RALPH, a citizen of the United States, residing at Ukiah, in the county of Mendocino and State of California, have invented a new and useful Tree-Protecting Attachment for Agricultural Implements, of which the following is a specification.

This invention relates to an improved attachment for agricultural implements—such as harrows, cultivators, and the like—when such implements are used in orchards for cultivating the soil between the trees, the said attachment being for the purpose of preventing the implement from contacting with and injuring the trees by scraping and destroying the bark, the objects of the invention being to provide a device or attachment of the class referred to which shall possess superior advantages in point of simplicity, durability, inexpensiveness, and general efficiency and which may be readily applied to the implement in connection with which it is to be used.

With these and other ends in view, which will readily appear as the nature of the invention is better understood, the same consists in the improved construction and novel arrangement and combination of parts, which will be hereinafter fully described, and particularly pointed out in the claim.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a perspective view showing a harrow having the improved tree-protecting device applied thereto. Fig. 2 is a vertical sectional view of a tree-protecting device detached. Fig. 3 is a detail plan view of the base-plate of the protecting device. Fig. 4 is a sectional detail view illustrating a modification.

Corresponding parts in the several figures are indicated throughout by similar characters of reference.

The improved tree-protecting device consists of a wheel or disk 1, mounted for rotation upon a spindle 2, extending upwardly from a base-plate 3. The latter is provided with laterally-extending lugs 4 4, having slots 5 5 for the passage of bolts 6 6, whereby it may be secured adjustably upon one of the side beams 7 of a harrow, which has been illustrated at H in Fig. 1 of the drawings, or the said base-plate may be secured in a suitable position upon the frame of any agricultural implement in connection with which it may be used or upon the box or frame of a wagon or other vehicle that is to be utilized in an orchard where it is in danger of coming injuriously into contact with the trunks of the trees.

The base-plate 3 is provided with a rib or reinforcing-flange 7, from which the spindle 2 rises, said spindle being conical in shape and wide at the base thereof, so that it will be possessed of great strength and will not be easily broken. The wheel or disk 1 has a hub 8, with a conical bore engaging the spindle upon which it is supported for rotation and where it is secured by means of a washer 9 and a split key 10. The wheel or disk, which is thus supported in a horizontal position, or approximately so, is provided at its lower edge with an annular flange 11, serving to support a rim or tire 12, which may be made of rubber, leather, or any other suitable soft and flexible material and which, if desired, may be padded, so as to positively prevent the trunks of trees from being bruised by contact therewith. An example of a wheel 1, having a tire 14 provided with stuffing or padding 15, has been illustrated in Fig. 4 of the drawings.

From the foregoing description, taken in connection with the drawings hereto annexed, the operation and advantages of this invention will be readily understood. The construction is extremely simple and inexpensive, the parts of the device being preferably made of cast-iron, with the exception of the tire, which, as stated, may be made of any suitable material or combination of materials. By means of a pair of ordinary bolts the device may be mounted in position for operation upon any implement that is to be used in an orchard in such a manner that the edge or rim of the wheel or disk shall project beyond the frame of the implement, so that if said frame slew or sway in the direction of the tree-trunks the shock of the contact will be taken up by the padded rim of the wheel or disk, which will serve to guide the frame of the implement away from the tree-trunk without injuriously contacting with the latter.

Having thus described the invention, what is claimed is—

In a device of the class described, a base-plate having adjusting-slots, a strengthening-rib, and a conical spindle; in combination with a flanged wheel supported for rotation upon said spindle; and a yieldable tire supported upon said flanged wheel.

In testimony that I claim the foregoing as my own I have hereto affixed my signature in the presence of two witnesses.

ARTHUR WILLIAM RALPH.

Witnesses:
 THEODORE SAFRENTS,
 TAYLOR H. DILL.